(12) United States Patent
Agarwal et al.

(10) Patent No.: US 11,379,256 B1
(45) Date of Patent: Jul. 5, 2022

(54) DISTRIBUTED MONITORING AGENT DEPLOYED AT REMOTE SITE

(71) Applicant: Cisco Technology, Inc., San Jose, CA (US)

(72) Inventors: Vivek Agarwal, Chelmsford, MA (US); Om Prakash Suthar, Bolingbrook, IL (US); Elie El Ajaltouni, Ottawa (CA); Yves Jean-René do Rêgo, Kanata (CA); Michael Yeung, Manotick (CA)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/996,316

(22) Filed: Aug. 18, 2020

Related U.S. Application Data

(60) Provisional application No. 62/982,863, filed on Feb. 28, 2020.

(51) Int. Cl.
| G06F 9/455 | (2018.01) |
| H04L 41/0806 | (2022.01) |
| H04L 9/40 | (2022.01) |
| G06F 21/53 | (2013.01) |

(52) U.S. Cl.
CPC .......... *G06F 9/45558* (2013.01); *G06F 21/53* (2013.01); *H04L 41/0806* (2013.01); *H04L 63/0272* (2013.01)

(58) Field of Classification Search
CPC . G06F 9/45558; G06F 21/53; H04L 41/0806; H04L 63/0272
USPC ........................................................ 709/223
See application file for complete search history.

(56) References Cited

U.S. PATENT DOCUMENTS

| 5,710,885 A | * | 1/1998 | Bondi | .................... H04L 41/12 709/224 |
| 7,899,048 B1 | * | 3/2011 | Walker | .................... H04L 43/18 370/390 |
| 2010/0122120 A1 | * | 5/2010 | Lin | .......................... G06F 21/55 714/47.3 |
| 2016/0335111 A1 | * | 11/2016 | Bruun | .................. H04L 43/0817 |
| 2016/0373474 A1 | * | 12/2016 | Sood | ........................ H04L 41/28 |

OTHER PUBLICATIONS

Cisco, "OpFlex: An Open Source Approach", White Paper, C11-731304-00, Mar. 2014, 3 pages.
Nokia, "Trusted NFV systems", White Paper, Product code: SR1707013511EN, Jul. 2017, 13 pages.

(Continued)

*Primary Examiner* — Glenton B Burgess
*Assistant Examiner* — Patrick F Ngankam
(74) *Attorney, Agent, or Firm* — Edell, Shapiro & Finnan, LLC

(57) ABSTRACT

In one example, a Virtual Network Function Manager (VNFM) obtains, from a monitoring agent that is configured to monitor a Virtual Network Function (VNF) for a presence of a technical issue with the VNF, an indication of the presence of the technical issue with the VNF. The monitoring agent is deployed at a remote site. Based on the indication of the presence of the technical issue with the VNF, the VNFM determines a resolution for the presence of the technical issue with the VNF. The VNFM automatically implements the resolution for the presence of the technical issue with the VNF.

20 Claims, 9 Drawing Sheets

(56) References Cited

OTHER PUBLICATIONS

Nokia, "Nokia CloudBand Infrastructure Software", Data sheet, Document code: SR2007045736EN, CID200058, Jul. 2020, 5 pages.
Nokia, "Nokia CloudBand Application Manager", Release 19.x, Document code: SR1810029792EN, CID 200057, Oct. 2018, 3 pages.
Nokia, "CloudBand Network Director", Release 19, Document code: SR1809028730EN, CID 200059, Sep. 2018, 4 pages.
Nokia, "Scale management and orchestration in the telco cloud with Nokia CloudBand and VMware vCloud NFV", Product code: SR1710017904EN, Nov. 2017, 10 pages.
Nokia, "CloudBand", Release 17.5, Product code: SR1707013648, Jul. 2017, 5 pages.
Vmware, "VMware NSX", The Platform for Network, https://www.virtualizationworks.com/NSX.asp?utm_term=vmware, downloaded Aug. 5, 2020, 6 pages.
Pothuganti, Sridhar et al., "Distributed VNF Management", Architecture and Use cases, Jun. 2017, 21 pages.
Open Platform for NFV (OPNFV), "Distributed VNF Management: Architecture and Use-cases—Sridhar Pothuganti, Trinath Somanchi", https://www.youtube.com/watch?v=r5RdTaqXhWI, Jun. 20, 2017, 1 page.

* cited by examiner

```
<kpi_data>
<kpi>
<event_name>VM_ALIVE</event_name>
<monitoring_agent_id>csp1-mona</monitoring_agent_id>  ~510
...
</kpi>
</kpi_data>
```

DISTRIBUTED MONITORING AGENT DEPLOYED AT REMOTE SITE

CROSS REFERENCE TO RELATED APPLICATION

This application claims the benefit of U.S. Provisional Application No. 62/982,863, filed Feb. 28, 2020, the entirety of which is incorporated herein by reference.

TECHNICAL FIELD

The present disclosure relates to telecommunications technology.

BACKGROUND

A Virtual Network Function Manager (VNFM) is responsible for the Life Cycle Management (LCM) of Virtual Network Functions (VNFs) after the VNFs are deployed. LCM can involve tasks such as VNF onboarding, instantiation, configuration, etc. A VNFM is typically typically expected to manage a few hundred VNFs, and generally requires 8 virtual Central Processing Units (vCPUs) and 16 GB of memory.

BRIEF DESCRIPTION OF THE DRAWINGS

FIG. 5 illustrates example Key Performance Indicator (KPI) data that includes an identifier of a distributed monitoring agent deployed at a remote site, according to an example embodiment.

DESCRIPTION OF EXAMPLE EMBODIMENTS

Overview

In one example embodiment, a Virtual Network Function Manager (VNFM) obtains, from a monitoring agent that is configured to monitor a Virtual Network Function (VNF) for a presence of a technical issue with the VNF, an indication of the presence of the technical issue with the VNF. The monitoring agent is deployed at a remote site. Based on the indication of the presence of the technical issue with the VNF, the VNFM determines a resolution for the presence of the technical issue with the VNF. The VNFM automatically implements the resolution for the presence of the technical issue with the VNF.

Example Embodiments

Figure 1:
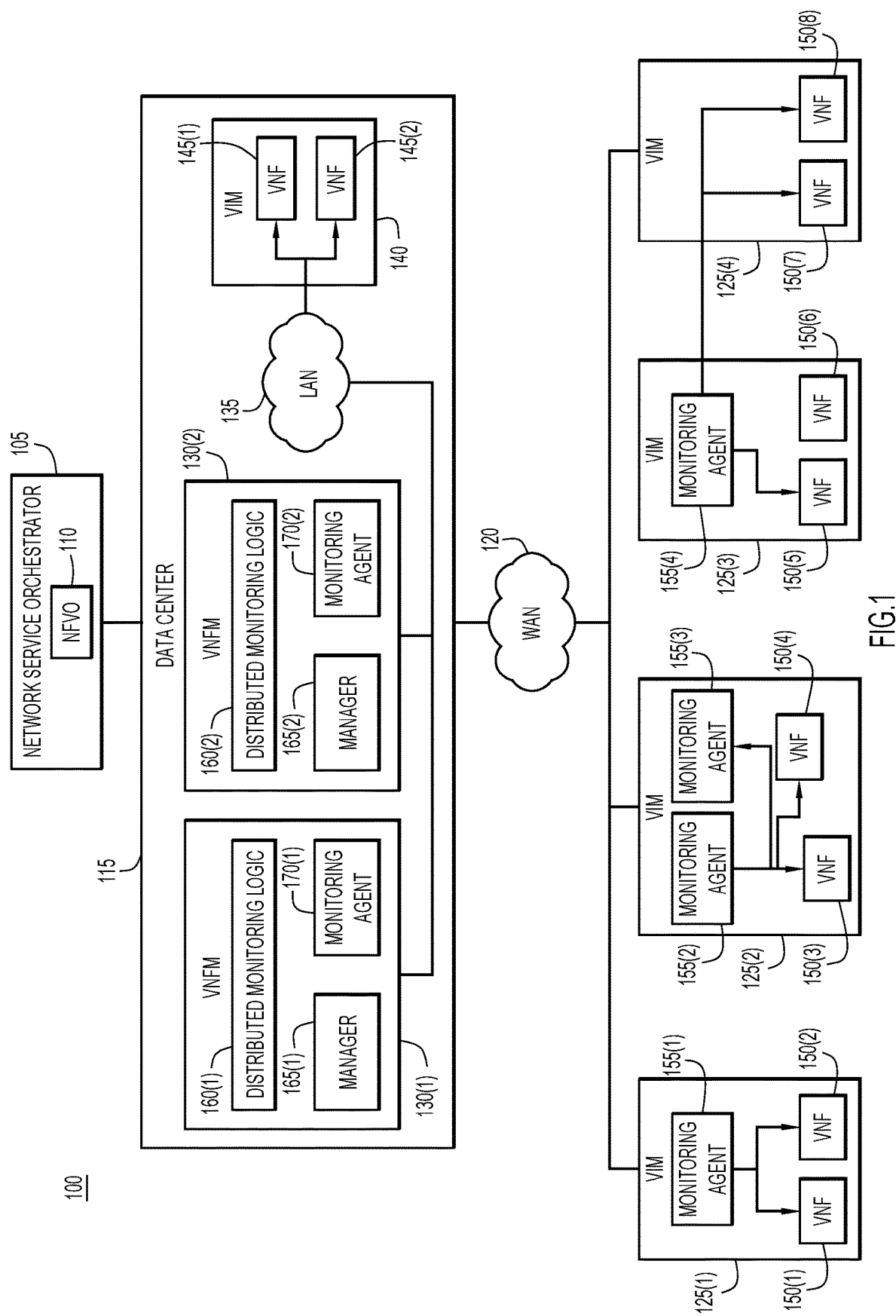
FIG. 1 illustrates a block diagram of a system configured to monitor a Virtual Network Function (VNF) using a distributed monitoring agent deployed at a remote site, according to an example embodiment.

FIG. 1 illustrates a block diagram of an example system 100 comprising a Network Function Virtualization Infrastructure (NFVI) cloud deployed in a distributed architecture having multiple locations. System 100 includes a network service orchestrator 105, which in turn includes Network Function Virtualization Orchestrator (NFVO) 110, data center 115, Wide Area Network (WAN) 120, and Virtualized Infrastructure Managers (VIMs) 125(1)-125(4). Data center 115 includes VNF Managers (VNFMs) 130(1) and 130(2). It will be appreciated that any suitable number of VNFMs may be utilized. In one example, VNFM 130(1) is an active (primary) VNFM and VNFM 130(2) is a standby (backup) VNFM provided for geo-resiliency purposes. Data center 115 further includes Local Area Network (LAN) 135 and VIM 140, which includes VNFs 145(1) and 145(2). LAN 135 enables communication between VNFMs 130(1) and 130(2) and VNFs 145(1) and 145(2).

VIM 125(1) includes VNFs 150(1) and 150(2), VIM 125(2) includes VNFs 150(3) and 150(4), VIM 125(3) includes VNFs 150(5) and 150(6), and VIM 125(4) includes VNFs 150(7) and 150(8). VNFs 150(1)-150(8) may include any suitable number of Virtual Machines (VMs) (e.g., ten to fifteen VMs each). Example of VMs include virtualized Central Unit (vCU) and virtualized Distributed Units (vDUs), although it will be appreciated that VNFs 150(1)-150(8) may include any suitable type of VM. Furthermore, VNFs 150(1)-150(8) may be one or more Cloud-native Network Functions (CNFs). Similar considerations may apply to VNFs 145(1) and 145(2).

VNFs 150(1)-150(8) may be located at one or more remote sites (e.g., sites that are remote from data center 115). The remote sites may be located geographically or topologically closer to a Radio Access Network (RAN) than data center 115. The remote sites may also use fewer servers than data center 115. Examples of remote sites include nano sites (pods) having at most two servers and edge sites having at most nine servers. By contrast, data center 115 may include hundreds of servers. A remote site may include any suitable number of VIMs. In one example, VIM 125(1) is located on a first edge site, VIM 125(2) is located on a second edge site, VIM 125(3) is located on a first nano site, and VIM 125(4) is located on a second nano site.

Conventionally, VNFM 130(1) would monitor each of VNFs 150(1)-150(8) over WAN 120 by sending messages and collecting the state of VNFs 150(1)-150(8). However, this approach does not scale and is not feasible in larger deployments. For example, while system 100 only shows eight VNFs 150(1)-150(8) located at remote sites, in practice the number of VNFs in a given system may grow to the thousands or even the tens of thousands. Since VNFM 130(1) would typically be expected to manage approximately hundreds of VNFs, additional VNFMs would be needed to accommodate the large number of VNFs. Thus, multiple VNFMs would be needed to monitor thousands of VNFs over WAN 120. This would require a large amount of overhead in the form of bandwidth that is not necessarily available over WAN 120. An estimate of the required bandwidth could be derived based on the number of VNFs and the pooling interval. Depending on the performance of WAN 120 (e.g., congestion, routing, network failures, etc.), and in particular the ability of WAN 120 to handle the required bandwidth, the reliability of system 100 could become compromised.

Furthermore, it is not possible/practical to address this problem by providing a VNFM at each remote site to eliminate the bandwidth requirement over WAN 120. Remote sites have resource constraints that prevent allocation of a VNFM to a given remote site. For example, because a VNFM might require 8 virtual Central Processing Units (vCPUs) and 16 GB of memory, providing a VNFM at a remote site would waste scarce resources at that remote site such as space, rack, and power. And even if it were possible to deploy a VNFM at every remote site, this would result in massive underutilization of each deployed VNFM. Each VNFM deployed at a given remote site would only need to monitor a small number of VMs despite being capable of monitoring thousands of VMs.

Accordingly, in order to address the aforementioned issues relating to bandwidth and resiliency of WAN 120, techniques are described to bring a small-footprint compute resource in the form of a lightweight monitoring microservice closer to VNFs 150(1)-150(8) and thereby improve the efficiency of system 100. In one example, monitoring agent 155(1) is provided at VIM 125(1), monitoring agents 155(2) and 155(3) are provided at VIM 125(2), and monitoring agent 155(4) is provided at VIM 125(3). Monitoring agents 155(1)-155(4) may be microservice instances with relatively small NFVI resource requirements (e.g., 1 vCPU and 500 MB of Random Access Memory (RAM)).

As shown, monitoring agents 155(1)-155(4) may be configured to manage VNFs 150(1)-150(8) in a variety of scenarios. Monitoring agent 155(1) is configured to monitor VNFs 150(1) and 150(2) for presence of a technical issue with VNFs 150(1) or 150(2). In this scenario, monitoring agent 155(1) is configured to monitor all VNFs (here, VNFs 150(1) and 150(2)) in VIM 125(1). Monitoring agents 155(2) and 155(3) are configured to monitor VNFs 150(3) and 150(4) for presence of a technical issue with VNFs 150(3) or 150(4). In this scenario, monitoring agents 155(2) and 155(3) are each configured to monitor both VNFs 150(3) and 150(4) for redundancy. Monitoring agent 155(4) is configured to monitor VNFs 150(5)-150(8) for presence of a technical issue with VNFs 150(5)-150(8). In this scenario, monitoring agent 155(4) is provided at VIM 125(3) and is configured to monitor VNFs 150(5) and 150(6) located at VIM 125(3), but is also configured to monitor VNFs 150(7) and 150(8) located in VIM 125(4).

Monitoring agents 155(1)-155(4) may collect state information of their respective VNFs 150(1)-150(8). For example, monitoring agent 155(1) may monitor VNF 150(1) using any suitable communication type, such as pings, Hypertext Transfer Protocol (HTTP)/HTTP Secure (HTTPS) Application Programming Interfaces (APIs), or Simple Network Management Protocol (SNMP). In one specific example, monitoring agent 155(1) may ping VNF 150(1) regularly. Monitoring agents 155(1)-155(4) may themselves be VNFs and/or VMs.

VNFMs 130(1) and 130(2) are provided with distributed monitoring logic 160(1) and 160(2), respectively, which cause VNFMs 130(1) and 130(2) to interact with monitoring agents 155(1)-155(4). In one example, VNFM 130(1) obtains, from monitoring agent 155(1), an indication of the presence of a technical issue with VNF 150(1). For instance, VNFM 130(1) may obtain state information of VNF 150(1) from monitoring agents 155(1), such as an HTTP Representational State Transfer (REST) response from monitoring agent 155(1) that reports the technical issue with VNF 150(1).

Based on the indication of the presence of the technical issue with VNF 150(1), VNFM 130(1) determines a resolution for the presence of the technical issue with VNF 150(1) and automatically implements the resolution for the presence of the technical issue with VNF 150(1). For example, VNFM 130(1) may automatically heal VNF 150(1) by automatically rebooting or redeploying VNF 150(1)). VNFM 130(1) may make Life Cycle Management (LCM) decisions regarding VNF 150(1) based on the state information of VNF 150(1). These techniques may decrease bandwidth over WAN 120, improve reliability, and lower response time when VNFM 130(1) detects a failure state transition with respect to VNF 150(1). It will be appreciated that while this particular example relates to VNFM 130(1), VNF 150(1), and monitoring agent 155(1), the techniques described herein may apply to any suitable network entity (e.g., VNFM 130(2), VNFs 150(2)-150(8), and/or monitoring agents 155(2)-155(4)).

In one example, VNFM 130(1) may refrain from obtaining an explicit indication of an absence of the technical issue with VNF 150(1). For instance, monitoring agent 155(1) may only send a message over WAN 120 if there is a technical issue with VNF 150(1) (e.g., when action by VNFM 130(1) is needed). Thus, instead of VNFM 130(1) monitoring VNF 150(1) over WAN 120, monitoring agent 155(1) may monitor VNF 150(1) locally at VIM 125(1) and provide one or more indications, if necessary, to VNFM 130(1) over WAN 120. The indication(s) from monitoring agent 155(1) to VNFM 130(1) may require less bandwidth over time than the procedure for VNFM 130(1) to monitor VNF 150(1), and as such, bandwidth over WAN 120 may be further reduced.

In one example, VNFM 130(1) may include manager 165(1) and monitoring agent 170(1), and VNFM 130(2) may include manager 165(2) and monitoring agent 170(2). Managers 165(1) and 165(2) may be centralized software of VNFM 130(1) configured to process incoming traffic. Monitoring agents 170(1) and 170(2) may be configured to monitor monitoring agents 155(1)-155(4) to ensure the health of monitoring agents 155(1)-155(4). For example, VNFM 130(1) may obtain, from monitoring agent 155(1), an indication of the presence of a technical issue with monitoring agent 155(1). The indication may be an explicit indication (e.g., a message indicating the presence of the technical issue) or an implicit indication (e.g., the absence of an expected message indicating that no technical issues are present, such as a ping response). Based on the indication of the presence of the technical issue with monitoring agent 155(1), VNFM 130(1) may determine a resolution for the presence of the technical issue with monitoring agent 155(1) and automatically implement the resolution for the presence of the technical issue with monitoring agent 155(1). Thus, VNFM 130(1) may perform LCM and automatic healing of monitoring agent 155(1) in addition to VNF 150(1). Again, it will be appreciated that while this particular example relates to VNFM 130(1), VNF 150(1), and monitoring agent 155(1), the techniques described herein may apply to any suitable network entity (e.g., VNFM 130(2), VNFs 150(2)-150(8), and/or monitoring agents 155(2)-155(4)).

VNFM 130(1) may also automatically adjust a deployment of monitoring agents 155(1)-155(4). Thus, system 100 may include a self-adjusting monitoring network whereby the workload of monitoring agents 155(1)-155(8) is constantly monitored and may be consequently adjusted by VNFM 130(1). In one example, as VNFs (e.g., VNFs 150(1)-150(8)) scale up/down or in/out, VNFM 130(1) (and/or VNFM 130(2)) may adjust the dimension and number of monitoring agents (e.g., monitoring agents 155(1)-155(4)) accordingly. VNFM 130(1) (and/or VNFM 130(2)) may scale VNFs based on defined Key Performance Indicators (KPIs) and/or thresholds. In another example, VNFM 130(1) (and/or VNFM 130(2)) may dynamically adjust an association between monitoring agents (e.g., monitoring agents 155(1)-155(4)) and VNFs (e.g., VNFs 150(1)-150(8)). This dynamic association may ensure that the most effective and efficient monitoring is being employed in the monitoring network. In still another example, VNFM 130(1) (and/or VNFM 130(2)) may automatically heal a given monitoring agent (e.g., monitoring agents 155(1)-155(4)) in response to failure of the given monitoring agent. It may not be necessary to leveraging traditional High-Availability (HA) techniques with the given monitoring agent due to the increased bandwidth and reliability provided herein.

Figure 2:
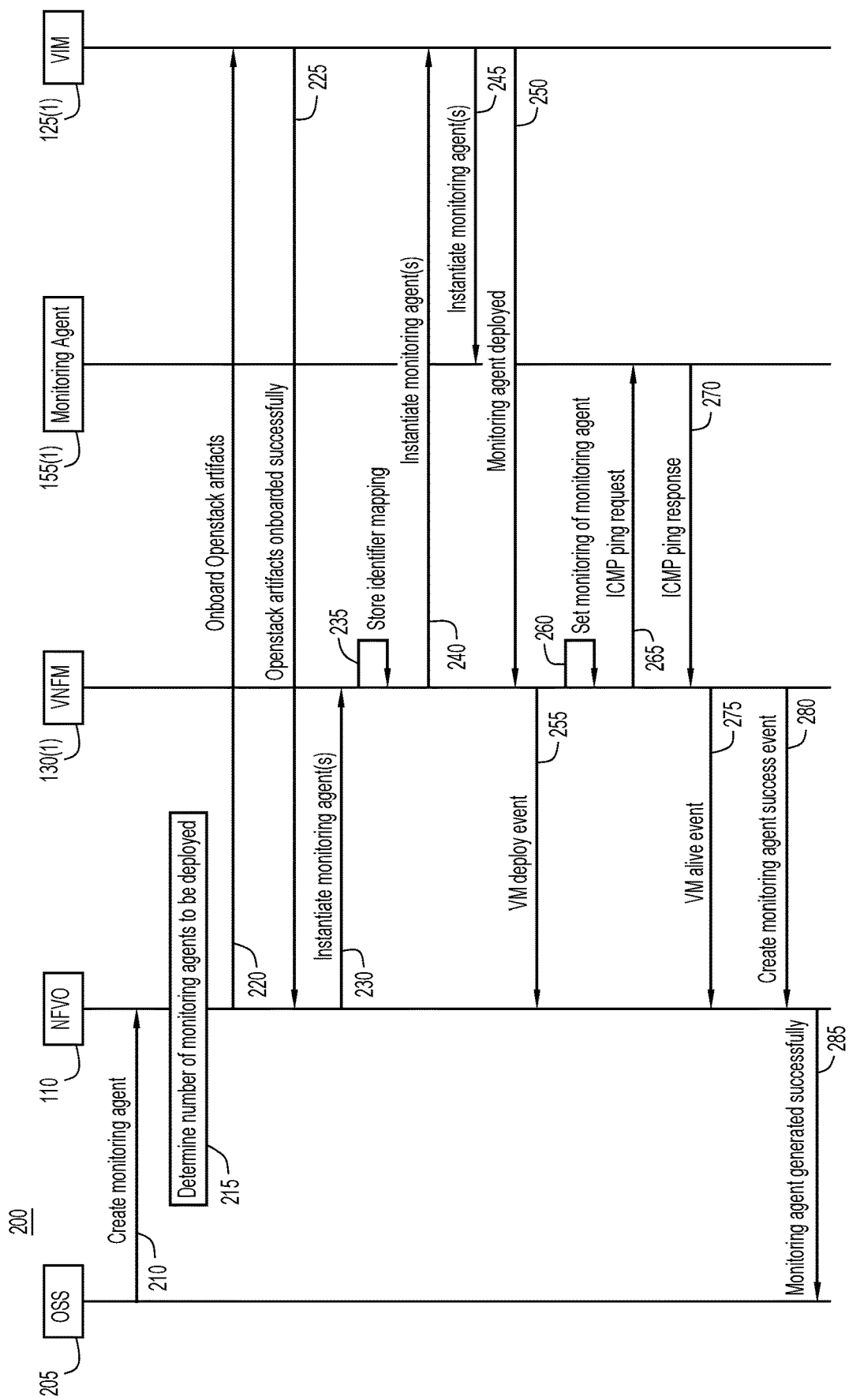
FIG. 2 illustrates a call flow diagram of a method for instantiating and monitoring a distributed monitoring agent at a remote site, according to an example embodiment.

With continued reference to FIG. 1, reference is now made to FIG. 2. FIG. 2 illustrates an example call flow diagram of a method 200 for instantiating and monitoring a distributed monitoring agent at a remote site. In particular, method 200 illustrates creation of monitoring agent 155(1) at VIM 125(1). Method 200 includes operations involving Operations Support System (OSS) 205, NFVO 110, VNFM 130(1), monitoring agent 155(1), and VIM 125(1). It may be assumed that VNFM 130(1) and NFVO 110 have already been launched, VIM 125(1) is ready to host monitoring agent 155(1), and an identifier of monitoring agent 155(1) is available.

At operation 210, OSS 205 initiates monitoring agent instance creation request (e.g., a request message in the form of a REST API call) to NFVO 110 to create (start initiation of) a monitoring agent at VIM 125(1). Before sending the REST API call, OSS 205 may perform a database lookup to determine the VIM where the monitoring agent is to be launched (here, VIM 125(1)). OSS 205 may provide an identifier of VIM 125(1) to NFVO 110 in the REST API call. The indication may include an identifier of VIM 125(1).

At operation 215, upon receiving the monitoring agent instance creation request with the identifier of VIM 125(1), NFVO 110 determines the number of monitoring agents that need to be launched at VIM 125(1). NFVO 110 may automatically design and deploy monitoring agents in a network across remote sites based on an Artificial Intelligence (AI) analysis of various input attributes. These attributes may ultimately account for constraints from Network Function (NF) Service Level Agreements (SLAs) provided to customers and resource/topology constraints of the infrastructure. The attributes may include the number of VNFs deployed at a remote site, monitoring techniques (e.g., ping, HTTP/HTTPS, SNMP, etc.), the number of remote sites to be monitored, affinity and anti-affinity rules (e.g., Openstack rules regarding which VNFs or VMs can be deployed on the same server or on different servers), and NFVI resources available for the monitoring agent(s) (e.g., vCPU, memory, storage, etc.). In this example, NFVO 110 may determine that two monitoring agents need to be deployed at VIM 125(1) (corresponding to monitoring agents 155(1) and 155(2)). For ease of explanation, only monitoring agent 155(1), and not monitoring agent 155(2), is illustrated in FIG. 2. However, it will be appreciated that similar operations may apply with respect to monitoring agent 155(2).

At operation 220, NFVO 110 triggers an Openstack API request to VIM 125(1). This request is to create the Openstack artifacts needed for launching the monitoring agent(s) at VIM 125(1). The Openstack artifacts may include the flavor, image, volume, and networking requirements of the monitoring agent(s). Flavor requirements may include vCPU and RAM requirements. Image requirements may include software build requirements (e.g., the type of software/image used). Volume requirements may include volume for attaching additional required details to a VM (e.g., billing records). Networking requirements may include requirements for accessing a VM, active/standby settings, etc.

At operation 225, VIM 125(1) sends back a response to NFVO 110 indicating that the Openstack resources have been successfully onboarded. At operation 230, NFVO 110 triggers an API request to VNFM 130(1) to instantiate the monitoring agent(s). NFVO 110 may generate respective random identifier(s) for the monitoring agent(s) and send the request to the VNFM 130(1) along with the identifier of VIM 125(1), where the monitoring agent(s) are to be launched.

At operation 235, VNFM 130(1) stores a mapping of the identifier of the monitoring agent(s) to the identifier of VIM 125(1). Typically, OSS 205 would maintain this mapping to manage subsequent operations with regard to one or more monitoring agents. However, OSS 205 may be unable to manage the subsequent operations in the case of failure or missing information. Accordingly, VNFM 130(1) may store the mapping to allow VNFM 130(1) to handle subsequent operations if necessary/desirable. Additionally/alternatively, NFVO 110 may also be configured to create a mapping table correlating the monitoring agent identifiers to VIM identifiers. This may enable VNFM 130(1) to determine which monitoring agents are launched at a given VIM by consulting with NFVO 110. This input table may also be used by NFVO 110 to determine the monitoring agent(s) to be launched in subsequent requests.

At operation 240, VNFM 130(1) provides, to VIM 125(1), an indication to instantiate monitoring agents 155(1). At operation 245, VIM 125(1) instantiates monitoring agent 155(1). At operation 250, VIM 125(1) provides an indication to VNFM 130(1) that monitoring agent 155(1) has been successfully deployed (e.g., in the form of a monitoring agent event). At operation 255, VNFM 130(1) sends, to NFVO 110, an indication that monitoring agent 155(1) has been successfully deployed (e.g., in the form of a VM deploy event).

At operation 260, VNFM 130(1) initiates monitoring of monitoring agent 155(1). VNFM 130(1) may perform LCM (e.g., monitoring) of monitoring agent 155(1) because monitoring agent 155(1) may itself be a VNF. At operation 265, VNFM 130(1) may send an Internet Control Message Protocol (ICMP) ping request to monitoring agent 155(1). VNFM 130(1) may continue to send period ICMP pings to monitoring agent 155(1) thereafter. At operation 270, VNFM 130(1) obtains, from monitoring agent 155(1), an indication of the absence of a technical issue with monitoring agent 155(1) in the form of an ICMP ping response. Thus, VNFM 130(1) determines that monitoring agent 155 (1) is reachable.

At operation 275, VNFM 130(1) sends, to NFVO 110, an indication that monitoring agent 155(1) is alive (e.g., in the form of a VM alive event). At operation 280, VNFM 130(1) provides, to NFVO 110, an indication that monitoring agent 155(1) has been successfully created (e.g., in the form of a create monitoring agent success event). At operation 285, NFVO 110 may send, to OSS 205, an indication that monitoring agent 155(1) was successfully generated (e.g., in the form of a monitoring agent create success event). NFVO 110 may include in the indication the monitoring agent identifier. This may allow OSS 205 may maintain a mapping of the monitoring agent identifier to the identifier of VIM 125(1).

Figure 3A:
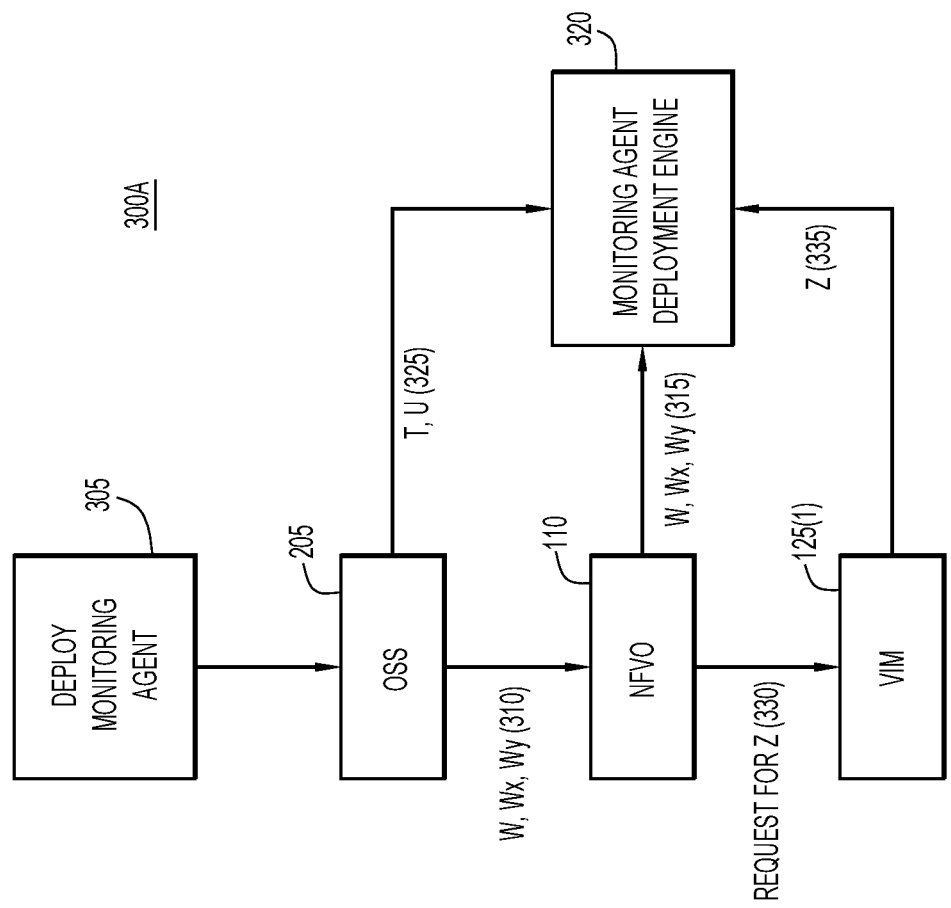
FIG. 3A illustrates a flowchart of a method for preparing to automatically determine a number of distributed monitoring agents to be deployed at one or more remote sites, according to an example embodiment.
Figure 3B:
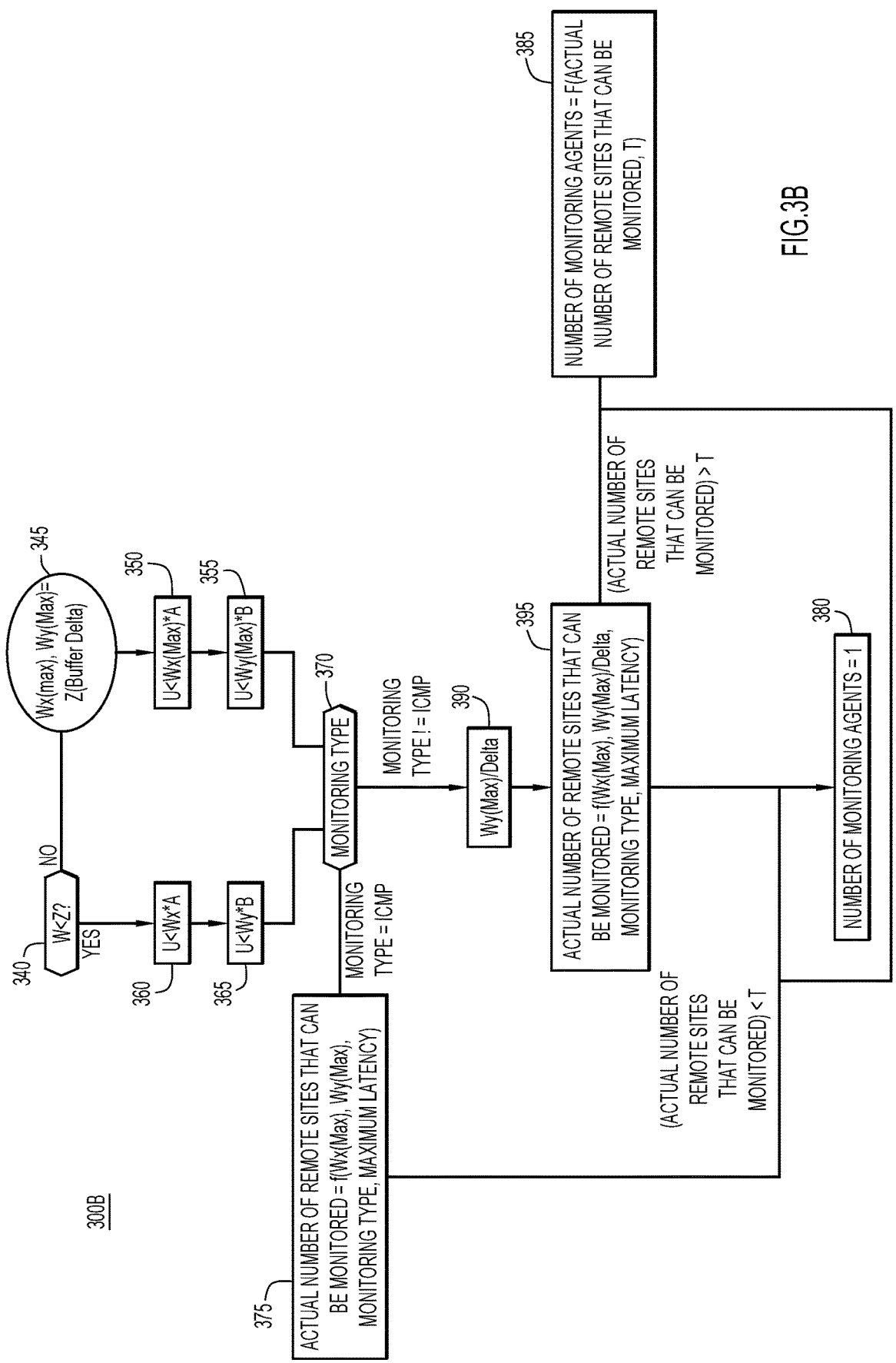
FIG. 3B illustrates a flowchart of a method for automatically determining a number of distributed monitoring agents to be deployed at one or more remote sites, according to an example embodiment.

With continuing reference to FIGS. 1 and 2, reference is now made to FIG. 3A. FIG. 3A illustrates a flowchart of an example method 300A for preparing to automatically determine a number of monitoring agents to be deployed at VIM 125(1). FIG. 3B illustrates a flowchart of an example method 300B for automatically determining a number of monitoring agents to be deployed at VIM 125(1). Thus, method 300B may occur after (e.g., be a continuation of) method 300A. In one example, methods 300A and 300B may be invoked when operation 215 (FIG. 2) is performed.

The following terms are defined with respect to the descriptions of FIGS. 3A and 3B.
W=Flavor of the monitoring agent(s) to be deployed
Wx=vCPU
Wy=vRAM
T=Number of remote sites to be monitored by the monitoring agent(s)
U=Count of VMs deployed at the VIM to be monitored by the monitoring agent(s)
Z=Compute and RAM capacity of the VIM
A=Maximum number of VMs per vCPU
B=Maximum number of VMs per delta RAM
Wx(Max)=Maximum value of vCPU
Wy(Max)=Maximum value of vRAM Turning first to FIG. 3A, at operation 305, OSS 205 obtains an indication to deploy a monitoring agent. Operation 305 may occur before operation 210 (FIG. 2). At operation 310, OSS 205 may provide W, Wx, and Wy to NFVO 110. At operation 315, NFVO 110 provides W, Wx, and Wy to monitoring agent deployment engine 320, which in one example may be located on NFVO 110. NFVO 110 may also provide W, Wx, and Wy to OSS 205. At operation 325, OSS 205 provides T and U to monitoring agent deployment engine 320. At operation 330, NFVO 110 sends a request for Z to VIM 125(1). At operation 335, in response to request, VIM 125(1) sends an indication of Z to monitoring agent deployment engine 320. Thus, monitoring agent deployment engine 320 obtains W, Wx, Wy, T, U, and Z. As explained with reference to FIG. 3B, the number of monitoring agents to be deployed at VIM 125(1) may be a function of at least W, Wx, Wy, T, U, and/or Z. In one example, monitoring agent deployment engine 320 may provide, to OSS 205, an indication of the number of remote sites to be monitored and the number of VMs to be deployed at the remote sites.

Turning now to FIG. 3B, method 300B may be performed by monitoring agent deployment engine 320 to automatically determine a number of monitoring agents to be deployed at VIM 125(1). At operation 340, monitoring agent deployment engine 320 determines whether W is less than Z (e.g., whether the flavor of the monitoring agent(s) is less than the compute capacity at VIM 125(1)). If W is not less than Z, at operation 345 Wx(Max) and Wy(Max) are equal to Z. At operation 350, monitoring agent deployment engine 320 determines that U is less than Wx(max)*A (e.g., determines that the count of VMs deployed at VIM 125(1) is less than the maximum number of vCPUs corresponding to the flavor of the monitoring agent(s)). At operation 355, monitoring agent deployment engine 320 determines that U is less than Wy(max)*B (e.g., determine that the count of VMs deployed at VIM 125(1) is less than the maximum number of vRAM corresponding to the flavor of the monitoring agent(s)).

If W is less than Z, at operation 360, monitoring agent deployment engine 320 determines that U is less than Wx*A (e.g., determines that the count of VMs deployed at VIM 125(1) is less than the number of vCPUs corresponding to the flavor of the monitoring agent(s)). At operation 365, monitoring agent deployment engine 320 determines that U is less than Wy*B (e.g., determine that the count of VMs deployed at VIM 125(1) is less than the number of vRAM corresponding to the flavor of the monitoring agent(s)).

At operation 370, monitoring agent deployment engine 320 determines the type of monitoring used to monitor the VM(s). If the monitoring type is ICMP, then at operation 375 the value of the actual number of remote sites that can be monitored is a function of Wx(Max), Wy(Max), monitoring type, and maximum latency to the farthest remote site. If the actual number of remote sites that can be monitored is less than T, then at operation 380 the number of monitoring agents is set to one. If the actual number of remote sites that can be monitored is greater than T, then at operation 385 the number of monitoring agents is determined as a function of the actual number of remote sites that can be monitored and T.

If the monitoring type is not ICMP, then at operation 390 Wy(Max)/Delta is computed, and T is determined to be greater than one. At operation 395, the value of the actual number of remote sites that can be monitored is a function of Wx(Max), Wy(Max)/Delta, monitoring type, and maximum latency to the farthest remote site. If the actual number of remote sites that can be monitored is less than T, then at operation 380 the number of monitoring agents is set to one. If the actual number of remote sites that can be monitored is greater than T, then at operation 385 the number of monitoring agents is determined as a function of the actual number of remote sites that can be monitored and T.

Figure 4:
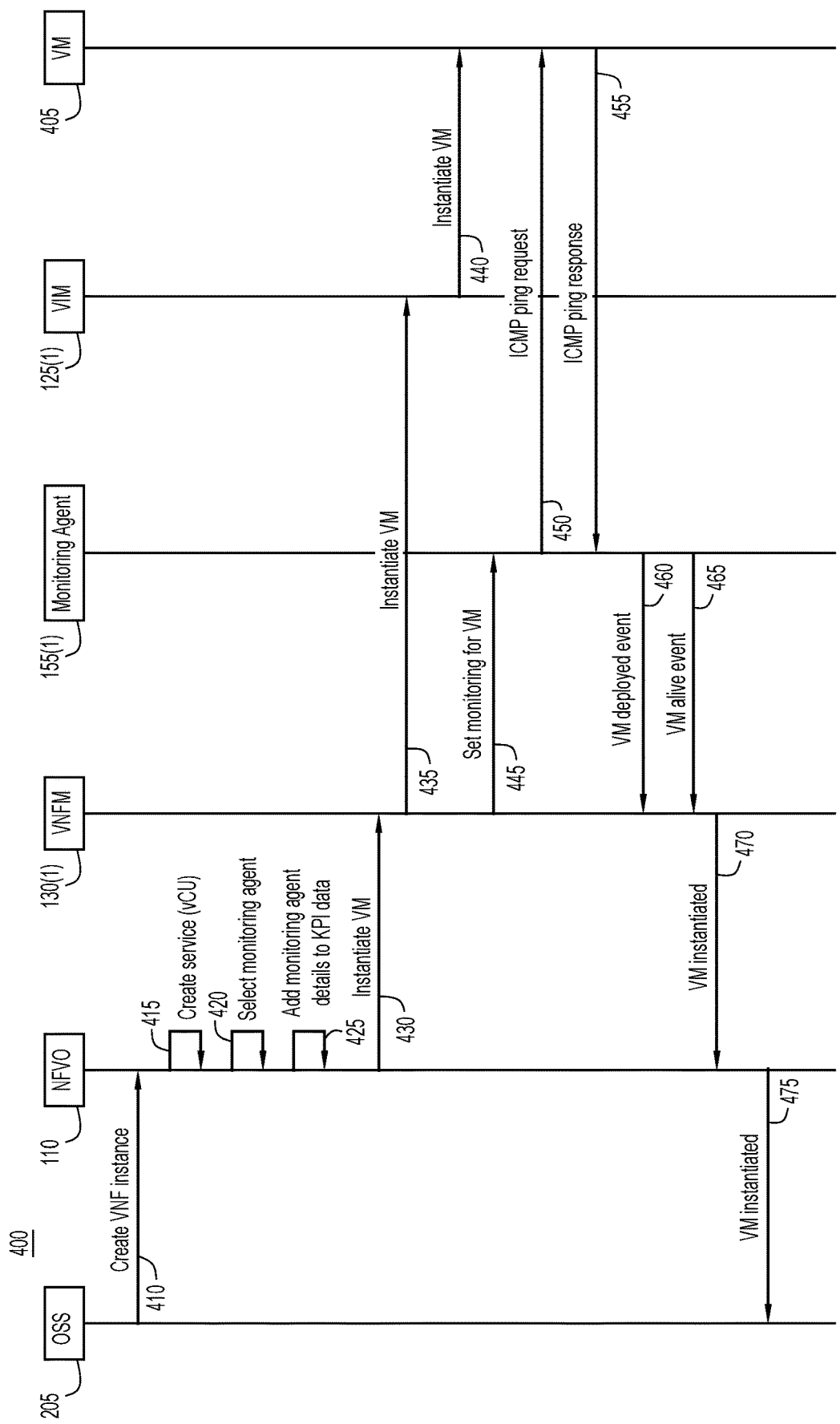
FIG. 4 illustrates a call flow diagram of a method for deploying and monitoring a Virtual Machine (VM) using a distributed monitoring agent deployed at a remote site, according to an example embodiment.

FIG. 4 illustrates a call flow diagram of an example method 400 for deploying and monitoring a VM using a distributed monitoring agent deployed at a remote site. Reference is also made to FIGS. 1 and 2 for purposes of the description of FIG. 4. Method 400 includes operations involving OSS 205, NFVO 110, VNFM 130(1), monitoring agent 155(1), VIM 125(1), and VM 405. VM 405 may be a vCU located at VNF 150(1). At operation 410, OSS 205 sends, to NFVO 110, a request to create a VNF instance (here, VM 405). OSS 205 may include in the request a vCU VNF Descriptor (VNFD), the identifier of monitoring agent 155(1), and the identifier of VIM 125(1). OSS 205 may provide this information based on the previously created mapping table discussed in connection with FIG. 2. If OSS 205 is unable to provide this information, NFVO 110 and/or VNFM 130(1) may be able to derive this information from the previously stored identifier mapping (e.g., at operation 235 of FIG. 2).

At operation 415, NFVO 110 locally initiates the process to create the requested service (here, VM 405). At operation 420, NFVO 110 selects monitoring agent 155(1) to use for VM 405. At operation 425, NFVO 110 adds details regarding monitoring agent 155(1) to KPI data for VNFM 130(1). NFVO 110 may create a VNFD file that includes Openstack artifact details for VM 405, the identifier of monitoring agent 155(1), and a monitoring table indicating the mapping of the identifier of monitoring agent 155(1) to the identifier of VM 405.

At operation 430, NFVO 110 sends, to VNFM 130(1), an indication to instantiate VM 405. VNFM 130(1) may decide that monitoring agent 155(1) will monitor VM 405 based on the monitoring table. At operation 435, VNFM 130(1) sends, to VIM 125(1), an indication to instantiate VM 405. At operation 440, VIM 125(1) instantiates VM 405. At operation 445, VNFM 130(1) sends, to monitoring agent 155(1), a request to start monitoring of VM 405.

At operation 450, monitoring agent 155(1) starts monitoring VM 405 using ICMP ping. At operation 455, monitoring agent 155(1) receives an ICMP ping response from VM 405. Thus, VNFM 130(1) obtains, from monitoring agent 155(1), an indication of the absence of a technical issue with VM 405 in the form of an ICMP ping response, and determines that VM 405 is reachable and alive.

At operation 460, monitoring agent 155(1) sends, to VNFM 130(1), an indication that VM 405 has been successfully deployed (e.g., in the form of a VM deployed event). At operation 465, monitoring agent 155(1) sends, to VNFM 130(1), an indication that VM 405 is alive (e.g., in the form of a VM alive event). At operation 470, VNFM 130(1) notifies NFVO 110 that VM 405 is instantiated (e.g., in the form of a VNF create success event). At operation 475, NFVO 110 notifies OSS 205 that VM 405 is instantiated (e.g., in the form of a VNF create success event).

With continued reference to FIGS. 1 and 4, FIG. 5 illustrates example KPI data 500. KPI data 500 may include identifier 510, which is an identifier of monitoring agent 155(1). In one example, NFVO 110 may include identifier 510 as an additional KPI property of KPI data 500 at operation 425 (FIG. 4).

Figure 6:
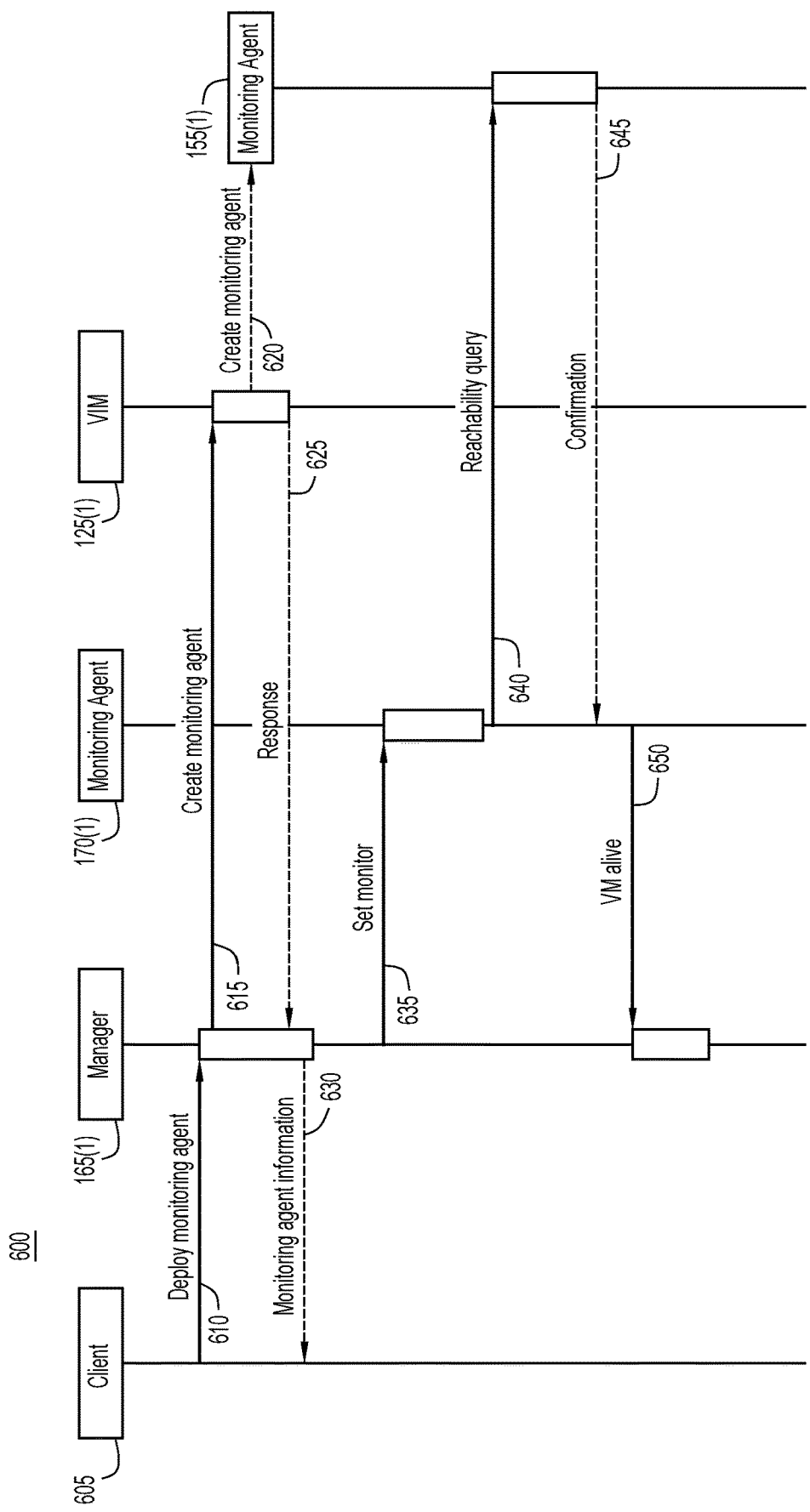
FIG. 6 illustrates a call flow diagram of a method for securely communicating with a distributed monitoring agent deployed at a remote site, according to an example embodiment.

With continued reference to FIG. 1, FIG. 6 illustrates a call flow diagram of an example method 600 for securely communicating with monitoring agent 155(1). Method 600 may include operations involving client 605, manager 165(1), monitoring agent 170(1), VIM 125(1), and monitoring agent 155(1). At operation 610, client 605 sends, to manager 165(1), an indication to deploy monitoring agent 155(1). The indication may have a deployment descriptor that includes a unique identifier of monitoring agent 155(1) and a security key (e.g., an API key) to secure access to monitoring agent 155(1).

In response to the indication, manager 165(1) may configure monitoring agent 155(1) with the security key. For example, at operation 615, manager 165(1) may send, to VIM 125(1), an indication to create monitoring agent 155(1) including the security key. At operation 620, VIM 125(1) creates monitoring agent 155(1) such that the day-zero configuration of monitoring agent 155(1) includes the security key. At operation 625, VIM 125(1) provides a response to manager 165(1) indicating that monitoring agent 155(1) has been created. At operation 630, manager 165(1) returns monitoring information to client 605.

At operation 635, manager 165(1) provides, to monitoring agent 170(1), an indication to set monitoring of monitoring agent 155(1). At operation 640, monitoring agent 170(1) sends, to monitoring agent 155(1), a communication that includes the security key. In this example, the communication is a reachability query to determine whether monitoring agent 155(1) is reachable. At operation 645, monitoring agent 170(1) obtains a confirmation that monitoring agent 155(1) is reachable from monitoring agent 155(1). In one example, monitoring agent 155(1) would not have responded to the reachability query had the reachability query not included the security key. Thus, the security key may prevent unauthorized access to monitoring agent 155(1). At operation 650, monitoring agent 170(1) may send an indication that monitoring agent 155(1) is alive (e.g., in the form of a VM alive message).

Figure 7:
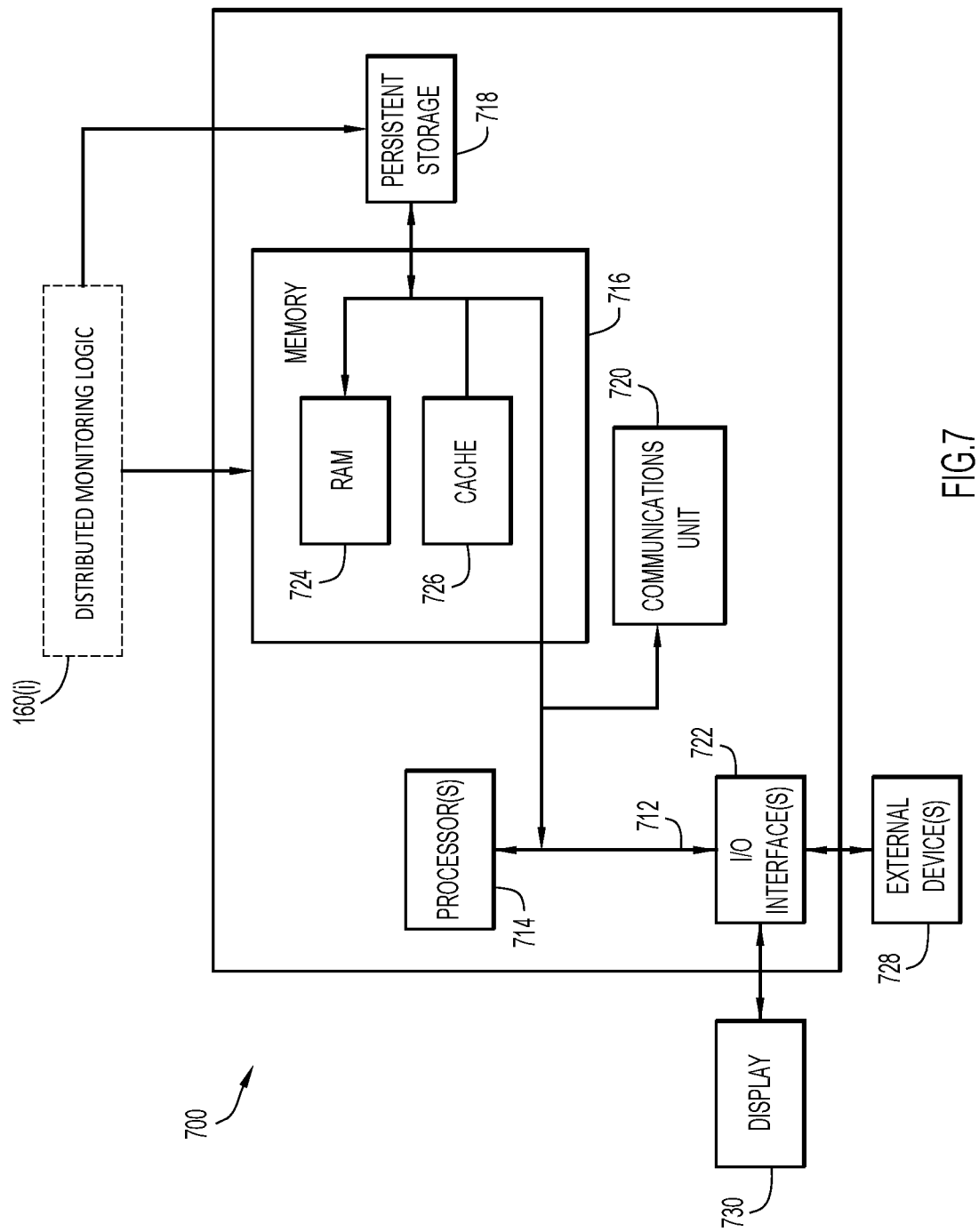
FIG. 7 illustrates a block diagram of a computing device configured to monitor a VNF using a distributed monitoring agent deployed at a remote site, according to an example embodiment.

FIG. 7 illustrates a hardware block diagram of an example computing device 700 configured to monitor a VNF using a monitoring agent deployed at a remote site. In one example, device 700 may host a VNFM (e.g., VNFM 130(1)). It should be appreciated that FIG. 4 provides only an illustration of one embodiment and does not imply any limitations with regard to the environments in which different embodiments may be implemented. Many modifications to the depicted environment may be made.

As depicted, the device 700 includes a bus 712, which provides communications between computer processor(s) 714, memory 716, persistent storage 718, communications unit 720, and Input/Output (I/O) interface(s) 722. Bus 712 can be implemented with any architecture designed for passing data and/or control information between processors (such as microprocessors, communications and network processors, etc.), system memory, peripheral devices, and any other hardware components within a system. For example, bus 712 can be implemented with one or more buses.

Memory 716 and persistent storage 718 are computer readable storage media. In the depicted embodiment, memory 716 includes Random Access Memory (RAM) 724 and cache memory 726. In general, memory 716 can include any suitable volatile or non-volatile computer readable storage media. Instructions for distributed monitoring logic 160(*i*) (e.g., distributed monitoring logic 160(1), distributed monitoring logic 160(2), etc.) may be stored in memory 716 or persistent storage 718 for execution by computer processor(s) 714.

One or more programs may be stored in persistent storage 718 for execution by one or more of the respective computer processors 714 via one or more memories of memory 716. The persistent storage 718 may be a magnetic hard disk drive, a solid state hard drive, a semiconductor storage device, Read-Only Memory (ROM), Erasable Programmable ROM (EPROM), Flash memory, or any other computer readable storage media that is capable of storing program instructions or digital information.

The media used by persistent storage 718 may also be removable. For example, a removable hard drive may be used for persistent storage 718. Other examples include optical and magnetic disks, thumb drives, and smart cards that are inserted into a drive for transfer onto another computer readable storage medium that is also part of persistent storage 718.

Communications unit 720, in these examples, provides for communications with other data processing systems or devices. In these examples, communications unit 720 includes one or more network interface cards. Communications unit 720 may provide communications through the use of either or both physical and wireless communications links.

I/O interface(s) 722 allows for input and output of data with other devices that may be connected to device 700. For example, I/O interface(s) 722 may provide a connection to external devices 728 such as a keyboard, keypad, a touch screen, and/or some other suitable input device. External devices 728 can also include portable computer readable storage media such as database systems, thumb drives, portable optical or magnetic disks, and memory cards.

Software and data used to practice embodiments can be stored on such portable computer readable storage media and can be loaded onto persistent storage 718 via I/O interface(s) 722. I/O interface(s) 722 may also connect to a display 730. Display 730 provides a mechanism to display data to a user and may be, for example, a computer monitor.

Figure 8:
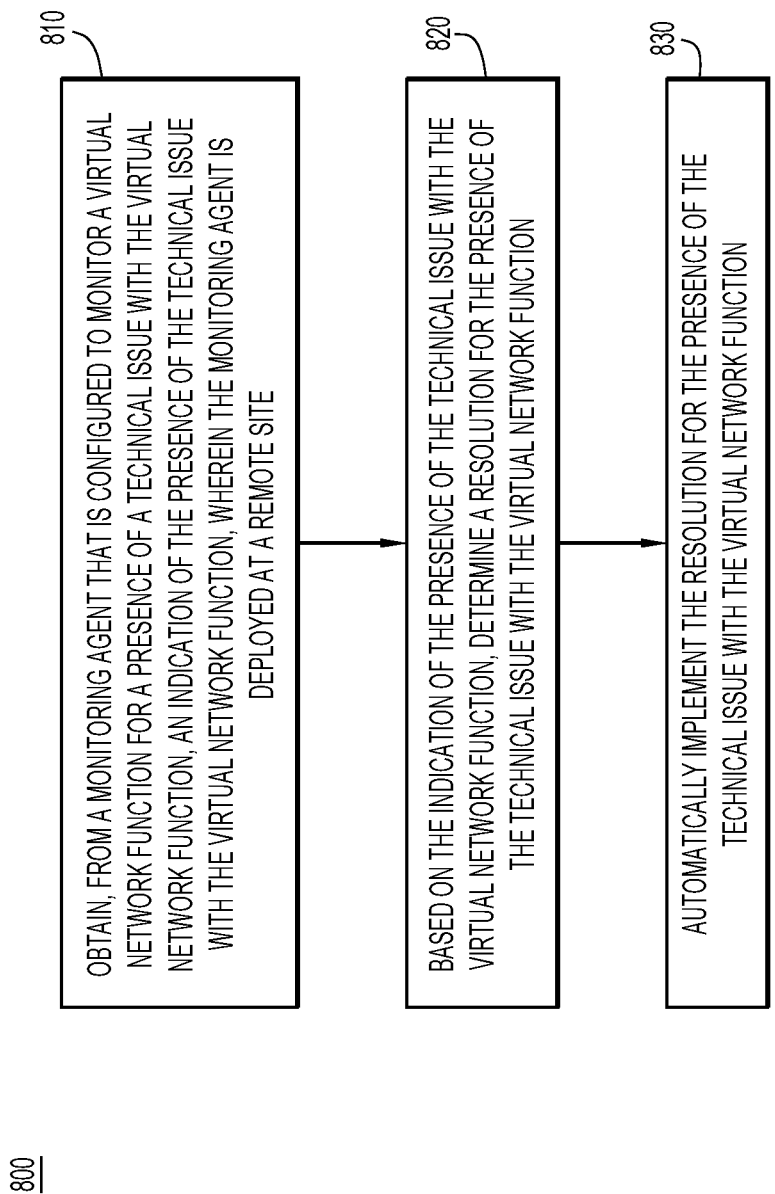
FIG. 8 illustrates a flowchart of a method for monitoring a VNF using a distributed monitoring agent deployed at a remote site, according to an example embodiment.

FIG. 8 is a flowchart of an example method 800 for monitoring a VNF using a distributed monitoring agent deployed at a remote site. At operation 810, a VNFM obtains, from a monitoring agent that is configured to monitor a VNF for a presence of a technical issue with the VNF, an indication of the presence of the technical issue with the VNF, wherein the monitoring agent is deployed at a remote site. At operation 820, based on the indication of the presence of the technical issue with the VNF, the VNFM determines a resolution for the presence of the technical issue with the VNF. At operation 830, the VNFM automatically implements the resolution for the presence of the technical issue with the VNF.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, Personal Digital Assistant (PDA), mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., Local Area Network (LAN), Wide Area Network (WAN), Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, Compact Disc ROM (CD-ROM), Digital Versatile Disk (DVD), memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, Virtual Private Network (VPN), etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., LAN, hardwire, wireless link, Intranet, etc.).

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

The system may employ any number of any conventional or other databases, data stores or storage structures (e.g., files, databases, data structures, data or other repositories, etc.) to store information. The database system may be implemented by any number of any conventional or other databases, data stores or storage structures to store information. The database system may be included within or coupled to the server and/or client systems. The database systems and/or storage structures may be remote from or local to the computer or other processing systems, and may store any desired data.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a ROM, EPROM, Flash memory, a Static RAM (SRAM), a portable CD-ROM, a DVD, a memory stick, a floppy disk, a mechanically encoded device, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a LAN, a WAN, and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, Instruction-Set-Architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, Field-Programmable Gate Arrays (FPGA), or Programmable Logic Arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In one form, a method is provided. The method comprises: obtaining, from a monitoring agent that is configured to monitor a virtual network function for a presence of a technical issue with the virtual network function, an indication of the presence of the technical issue with the virtual network function, wherein the monitoring agent is deployed at a remote site; based on the indication of the presence of the technical issue with the virtual network function, determining a resolution for the presence of the technical issue with the virtual network function; and automatically implementing the resolution for the presence of the technical issue with the virtual network function.

In one example, the method further comprises: automatically determining a number of monitoring agents including the monitoring agent to be deployed at the remote site.

In one example, the method further comprises: obtaining, from the monitoring agent, an indication of a presence of a technical issue with the monitoring agent; based on the indication of the presence of the technical issue with the monitoring agent, determining a resolution for the presence of the technical issue with the monitoring agent; and automatically implementing the resolution for the presence of the technical issue with the monitoring agent.

In one example, the method further comprises: automatically adjusting a deployment of the monitoring agent at the remote site.

In one example, the method further comprises: storing a mapping of an identifier of the monitoring agent to an identifier of a virtualized infrastructure manager associated with the remote site.

In one example, the method further comprises: configuring the monitoring agent with a security key; and providing the monitoring agent with a communication that includes the security key.

In one example, the method further comprises: refraining from obtaining an explicit indication of an absence of the technical issue with the virtual network function.

In another form, an apparatus is provided. The apparatus comprises: a network interface configured to obtain or provide network communications; and one or more processors coupled to the network interface, wherein the one or more processors are configured to: obtain, from a monitoring agent that is configured to monitor a virtual network function for a presence of a technical issue with the virtual network function, an indication of the presence of the technical issue with the virtual network function, wherein the monitoring agent is deployed at a remote site; based on the indication of the presence of the technical issue with the virtual network function, determine a resolution for the presence of the technical issue with the virtual network function; and automatically implement the resolution for the presence of the technical issue with the virtual network function.

In another form, one or more non-transitory computer readable storage media are provided. The non-transitory computer readable storage media are encoded with instructions that, when executed by a processor, cause the processor to: obtain, from a monitoring agent that is configured to monitor a virtual network function for a presence of a technical issue with the virtual network function, an indication of the presence of the technical issue with the virtual network function, wherein the monitoring agent is deployed at a remote site; based on the indication of the presence of the technical issue with the virtual network function, determine a resolution for the presence of the technical issue with the virtual network function; and automatically implement the resolution for the presence of the technical issue with the virtual network function.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   based on a compute capacity or a memory capacity of a virtualized infrastructure manager deployed at a remote site that is remote from a virtual network function manager, determining a number of monitoring agents to deploy within the virtualized infrastructure manager;
   deploying the number of monitoring agents within the virtualized infrastructure manager;
   obtaining, via a wide area network, by one or more processors, from a monitoring agent deployed within the virtualized infrastructure manager, the monitoring agent configured to monitor a virtual network function deployed at the remote site, an indication of a presence of a technical issue with the virtual network function;
   based on the indication of the presence of the technical issue with the virtual network function, determining, by the one or more processors, a resolution for the presence of the technical issue with the virtual network function; and
   implementing, by the one or more processors, the resolution for the presence of the technical issue with the virtual network function.

2. The method of claim 1, further comprising:
   querying the virtualized infrastructure manager for one or more of the compute capacity or the memory capacity; and
   receiving a response from the virtualized infrastructure manager, the response indicating the compute capacity or the memory capacity.

3. The method of claim 1, further comprising:
   obtaining, from the monitoring agent, an indication of a presence of a technical issue with the monitoring agent;
   based on the indication of the presence of the technical issue with the monitoring agent, determining a resolution for the presence of the technical issue with the monitoring agent; and
   automatically implementing the resolution for the presence of the technical issue with the monitoring agent.

4. The method of claim 1, further comprising:
   storing a mapping of an identifier of the monitoring agent to an identifier of the virtualized infrastructure manager associated with the remote site.

5. The method of claim 1, further comprising:
   configuring the monitoring agent with a security key; and
   providing the monitoring agent with a communication that includes the security key.

6. A system comprising:
   a virtual network function manager; and
   a network function virtualization orchestrator configured to, based on a compute capacity or a memory capacity of a virtualized infrastructure manager deployed at a remote site that is remote from the virtual network function manager, determine a number of monitoring agents to deploy within the virtualized infrastructure manager, wherein the virtual network function manager is configured to:
  deploy the number of monitoring agents within the virtualized infrastructure manager;
  obtain, via a wide area network, from a monitoring agent deployed within the virtualized infrastructure manager, the monitoring agent configured to monitor a virtual network function deployed at the remote site, an indication of a presence of a technical issue with the virtual network function;
  based on the indication of the presence of the technical issue with the virtual network function, determine a resolution for the presence of the technical issue with the virtual network function; and
  implement the resolution for the presence of the technical issue with the virtual network function.

7. The system of claim 6, wherein the virtual network function manager is further configured to:
  obtain, from the monitoring agent, an indication of a presence of a technical issue with the monitoring agent;
  based on the indication of the presence of the technical issue with the monitoring agent, determine a resolution for the presence of the technical issue with the monitoring agent; and
  automatically implement the resolution for the presence of the technical issue with the monitoring agent.

8. The system of claim 6, wherein the virtual network function manager is further configured to:
  store a mapping of an identifier of the monitoring agent to an identifier of the virtualized infrastructure manager associated with the remote site.

9. The system of claim 6, wherein the virtual network function manager is further configured to:
  configure the monitoring agent with a security key; and
  provide the monitoring agent with a communication that includes the security key.

10. The system of claim 6, wherein the monitoring agent is configured to detect a state of the virtual network function, and provide the state to the virtual network function manager, and wherein the virtual network function manager is further configured to detect a failure state transition based on the state provided by the monitoring agent, and determine the resolution based on the failure state transition.

11. The system of claim 10, wherein the monitoring agent is further configured to transmit an Internet Control Message Protocol (ICMP) ping request to a virtual machine (VM) included in the virtual network function, monitor whether a response to the ICMP ping request is received from the VM, and detect the state of the virtual network function based on whether the response is received.

12. One or more non-transitory computer readable storage media encoded with instructions that, when executed, configure one or more processors to perform operations comprising:
  based on a compute capacity or a memory capacity of a virtualized infrastructure manager deployed at a remote site that is remote from a virtual network function manager, determining a number of monitoring agents to deploy within the virtualized infrastructure manager;
  deploying the number of monitoring agents within the virtualized infrastructure manager;
  obtaining, via a wide area network, from a monitoring agent deployed within the virtualized infrastructure manager, the monitoring agent configured to monitor a virtual network function deployed at the remote site, an indication of a presence of a technical issue with the virtual network function;
  based on the indication of the presence of the technical issue with the virtual network function, determining a resolution for the presence of the technical issue with the virtual network function; and
  implementing the resolution for the presence of the technical issue with the virtual network function.

13. The one or more non-transitory computer readable storage media of claim 12, the operations further comprising:
  obtaining, from the monitoring agent, an indication of a presence of a technical issue with the monitoring agent;
  based on the indication of the presence of the technical issue with the monitoring agent, determining a resolution for the presence of the technical issue with the monitoring agent; and
  implementing the resolution for the presence of the technical issue with the monitoring agent.

14. The one or more non-transitory computer readable storage media of claim 12, the operations further comprising:
  adjusting a deployment of the monitoring agent at the remote site.

15. The one or more non-transitory computer readable storage media of claim 12, the operations further comprising:
  storing a mapping of an identifier of the monitoring agent to an identifier of the virtualized infrastructure manager associated with the remote site.

16. The one or more non-transitory computer readable storage media of claim 12, the operations further comprising:
  configuring the monitoring agent with a security key; and
  providing the monitoring agent with a communication that includes the security key.

17. The method of claim 1, wherein the monitoring agent is configured to detect a state of the virtual network function, and provide the state to the one or more processors via the wide area network, and the method further comprises detecting a failure state transition based on the state provided by the monitoring agent, wherein the determining of the resolution is based on the failure state transition.

18. The method of claim 17, wherein the monitoring agent is further configured to transmit an Internet Control Message Protocol (ICMP) ping request to a virtual machine (VM) included in the virtual network function, monitor whether a response to the ICMP ping request is received from the VM, and detect the state of the virtual network function based on whether the response is received.

19. The one or more non-transitory computer readable storage media of claim 12, wherein the monitoring agent is configured to detect a state of the virtual network function, and provide the state to the one or more processors via the wide area network, the operations further comprising detecting a failure state transition based on the state provided by the monitoring agent and determining the resolution based on the failure state transition.

20. The one or more non-transitory computer readable storage media of claim 19, wherein the monitoring agent is further configured to transmit an Internet Control Message Protocol (ICMP) ping request to a virtual machine (VM) included in the virtual network function, monitor whether a response to the ICMP ping request is received from the VM, and detect the state of the virtual network function based on whether the response is received.

* * * * *